UNITED STATES PATENT OFFICE.

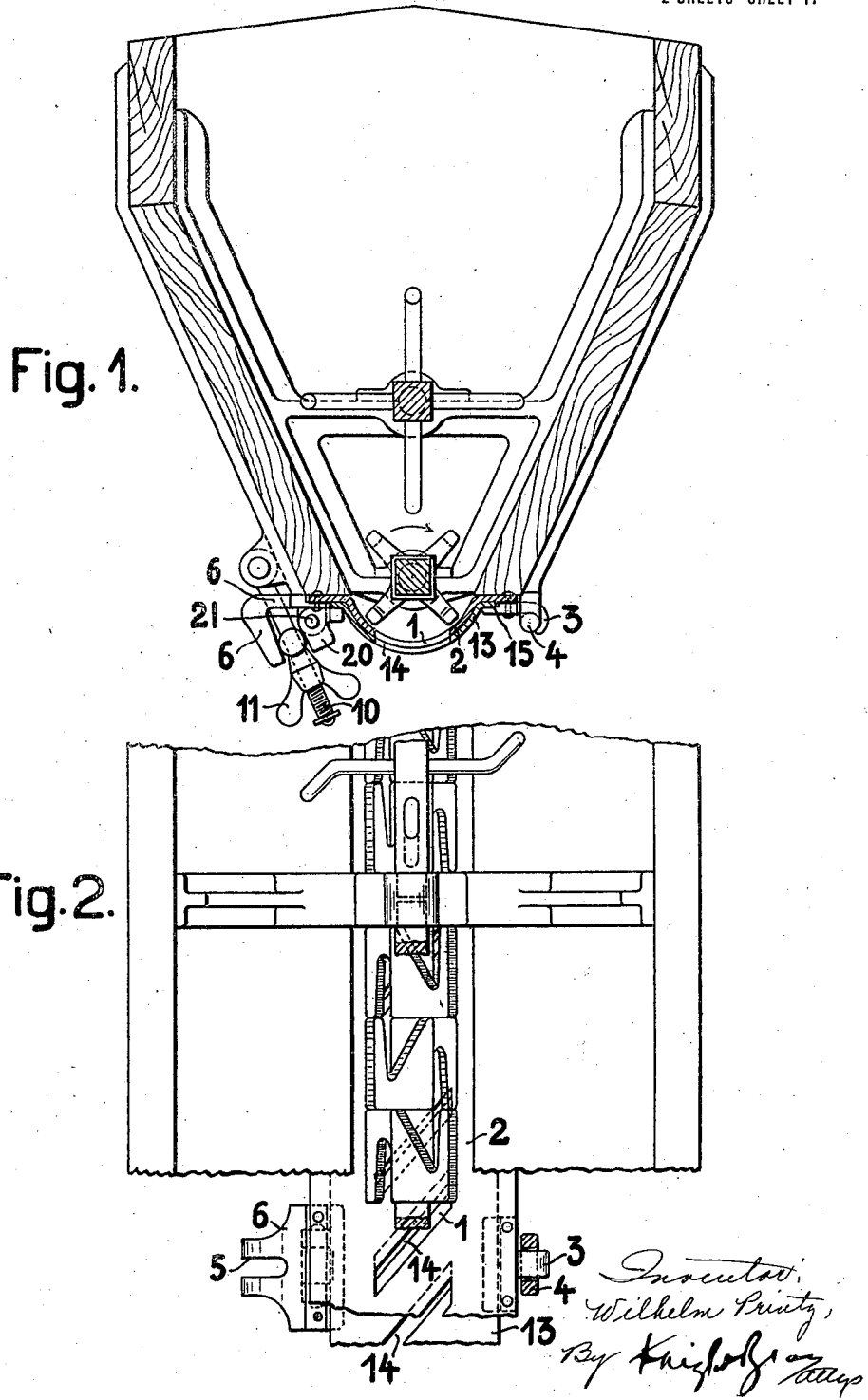

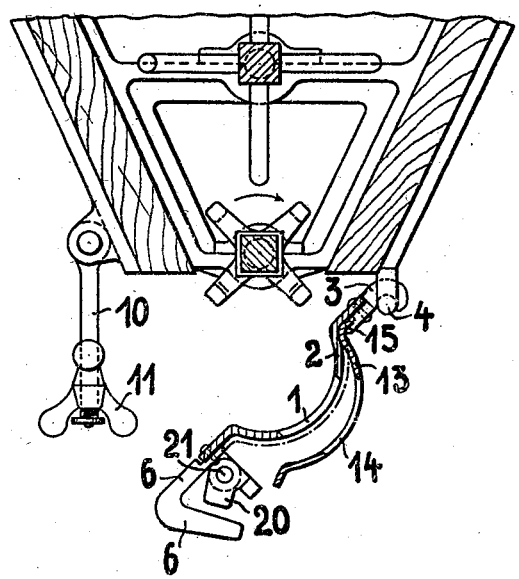

WILHELM PRINTZ, OF KETTWIG-RUHR, GERMANY.

FERTILIZER-DISTRIBUTING MACHINE.

1,418,169.  Specification of Letters Patent.  Patented May 30, 1922.

Application filed December 13, 1921. Serial No. 522,154.

*To all whom it may concern:*

Be it known that I, WILHELM PRINTZ, a citizen of the German Republic, residing at Kettwig-Ruhr, Germany, have invented certain new and useful Improvements in Fertilizer-Distributing Machines (for which I have filed an application in Germany July 28, 1920), of which the following is a specification.

This invention relates to machines for distributing fertilizers and having a trough-shaped hinged bottom and a gate. A machine of this kind is already known in which means are provided for enabling the removal of the bottom and the gate for cleaning these parts. The object of the present invention is to further improve distributing machines of this kind.

One embodiment of the subject-matter of the present invention is illustrated by way of example in the accompanying drawing in which:

Fig. 1 shows a cross section through the machine, the parts the invention is not dealing with, being omitted;

Fig. 2 shows the plan view of Fig. 1, some parts being broken away;

Fig. 3 shows a portion of Fig. 1 with certain parts in a different position.

The trough-shaped bottom 2 which is provided with oblique slots 1 carries on its one side hooks 3 which engage into eyes 4 fitted to the one side of the box. To the other side of the bottom 2 are attached hook-shaped ears 6 having each a slot 5. On these ears 6 angular pieces 20 are mounted pivotally or displaceably by means of pins 21. A screw bolt 10 pivotally mounted on the wall of the box and fitted with a wing nut 11 can be introduced into the slot 5 of each of the hook-shaped ears 6. The wing nut 11 enables the bottom 2 to be tightly pressed against the wall of the box through the intermediary of the ears 6 and the angular pieces 20. In this manner the bottom 2 is secured by a plurality of screws the number of which depends on the length of the box.

Beneath the trough-shaped bottom 2 there is disposed the trough-shaped gate 13 which is likewise provided with oblique slots 14. One of the edges of this gate is adapted to travel in grooves 15 provided in the body of the hooks 3 or along special ledges. The other edge of the gate is supported by one of the legs of the angular pieces 20 which are held in this position by the wing nut 11 abutting against their other legs. On unscrewing the nuts 11 the angular pieces 20 come to swing outwards so that their inner legs release the edge of the gate 13 and the gate can be removed from the bottom 2 (see Figure 3). After the parts have been cleaned, they can be attached again to the box in the same quick and easy manner.

Instead of the screws 10 with the wing nuts 11, bayonet locks may be employed for securing the bottom.

Claims:

1. In a machine for distributing fertilizer, a box for receiving the fertilizer, a slotted bottom hinged on said box, a slotted gate cooperating with said bottom, means for securing said bottom to said box in operative position, means embodying a pivoted angular member for securing said gate to said bottom in operative position, said bottom securing means in its operative position engaging one leg of said angular piece to cause the other leg of said angular piece to support said gate.

2. In a machine for distributing fertilizer, a box for receiving the fertilizer, a slotted bottom hinged to said box, a slotted gate cooperating with said bottom, a bolt and nut connection for securing said bottom to said box in operative position, a pivoted angular member for securing said gate to said bottom, the nut of said bolt and nut connection in the operative position of said bottom engaging one leg of said pivoted angular member to cause the other leg of said angular member to engage said gate to hold the same in operative position.

3. In a machine for distributing fertilizer, a box for receiving the fertilizer, a slotted bottom hinged on said bottom, a slotted gate cooperating with said bottom, bolts provided with nuts pivoted to said box, a corresponding number of pairs of hooked-shaped ears secured to said bottom and adapted to be engaged by said bolts to secure said bottom to said box in operative position, angular pieces pivoted to said bottom, one leg of each of said angular pieces forming in the operative position of said pieces, a support for said gate to hold said gate in its operative position, the other leg of each angular piece being adapted to be engaged by said bolt and nut to swing said angular piece to its operative position.

In testimony whereof the foregoing specification is signed in the presence of two witnesses.

WILHELM PRINTZ.

Witnesses:
JOHANN DECKERS,
CARL MÜLLER.